United States Patent
Niwa (10) Patent No.: US 10,019,212 B2
(45) Date of Patent: Jul. 10, 2018

(54) PRINTING APPARATUS THAT DECOMPRESSES AND UPDATES SOFTWARE INSTALLED THEREIN, METHOD OF CONTROLLING THE SAME, AND STORAGE MEDIUM

(71) Applicant: CANON KABUSHIKI KAISHA, Tokyo (JP)

(72) Inventor: Koji Niwa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/700,185

(22) Filed: Apr. 30, 2015

(65) Prior Publication Data
US 2015/0317103 A1 Nov. 5, 2015

(30) Foreign Application Priority Data
May 2, 2014 (JP) .................................. 2014-095256

(51) Int. Cl.
*G06F 3/12* (2006.01)
*G06F 8/654* (2018.01)
*G06F 9/445* (2018.01)

(52) U.S. Cl.
CPC ............ *G06F 3/1284* (2013.01); *G06F 3/123* (2013.01); *G06F 3/1217* (2013.01); *G06F 3/1285* (2013.01); *G06F 8/654* (2018.02); *G06F 8/665* (2013.01); *G06F 3/126* (2013.01)

(58) Field of Classification Search
None
See application file for complete search history.

(56) References Cited

U.S. PATENT DOCUMENTS

2005/0251799 A1* 11/2005 Wang .................. G06F 8/65
717/168
2012/0127527 A1* 5/2012 Nakabayashi ........ G06F 3/1204
358/1.15

FOREIGN PATENT DOCUMENTS

| JP | 2003025688 A | | 1/2003 |
| JP | 2006254027 A | | 9/2006 |
| JP | 2009086754 A | | 4/2009 |
| JP | 2009266139 A | * | 11/2009 |
| JP | 2013109571 A | * | 6/2013 |
| WO | 2005088452 A1 | | 9/2005 |

OTHER PUBLICATIONS

Office Action issued in Japanese Appln. No. 2014-095256 dated Dec. 5, 2017.

* cited by examiner

*Primary Examiner* — Andrew H Lam
(74) *Attorney, Agent, or Firm* — Rossi, Kimms, McDowell LLP (57) ABSTRACT

A printing apparatus that is capable of reducing downtime caused by software update. A printing apparatus downloads update software for updating software installed therein, and updates the installed software using the downloaded update software. The update software is downloaded by background processing. It is determined whether or not predetermined processing is being performed when the update software is decompressed. When it is determined that the predetermined processing is not being performed, the downloaded update software is decompressed by background processing, and the installed software is updated using the decompressed update software.

8 Claims, 6 Drawing Sheets

PRINTING APPARATUS THAT DECOMPRESSES AND UPDATES SOFTWARE INSTALLED THEREIN, METHOD OF CONTROLLING THE SAME, AND STORAGE MEDIUM

BACKGROUND OF THE INVENTION

Field of the Invention

The present invention relates to a printing apparatus that updates software installed therein, a method of controlling the same, and a storage medium.

Description of the Related Art

Conventionally, printing apparatuses in which a plurality of devices are operated in collaboration with each other include one that updates software of each device in the following manner: In updating the software, software encoded e.g. by encryption and compression is acquired from a server, and the printing apparatus is once shut down.

Then, the printing apparatus is started up in a start-up mode for updating the software, and the software of each device is updated after the encoded software is decrypted and decompressed.

Further, there has also been proposed a mechanism for updating software of some of devices while preferentially performing job processing (see Japanese Patent Laid-Open Publication No. 2013-109571).

In the technique described in Japanese Patent Laid-Open Publication No. 2013-109571, while preferentially performing job processing, out of a controller for controlling the operation of a multifunction peripheral and a device controller for controlling a printer section under the control of the controller, the device controller is subjected to firmware update.

However, when the software is updated while switching between a plurality of start-up modes, downtime is caused which is a time period during which the normal operation of the printing apparatus cannot be performed because of the start-up mode.

To cope with this, if the firmware update is performed during the normal operation so as to reduce the downtime, this interferes with or delays the normal operation of the printing apparatus.

SUMMARY OF THE INVENTION

The present invention provides a printing apparatus that is capable of reducing downtime caused by software update, a method of controlling the same, and a storage medium.

In a first aspect of the present invention, there is provided a printing apparatus comprising a printing unit configured to perform print processing based on a print job, an acquisition unit configured to acquire update firmware for updating firmware of the printing apparatus, and a decompression unit configured to execute decompression processing of the update firmware acquired by the acquisition unit, wherein in a case where the print processing is to be executed during execution of the print processing, the decompression unit suspends the decompression processing being executed.

In a second aspect of the present invention, there is provided a printing apparatus that is capable of performing print processing, comprising a reception unit configured to receive a user operation, an acquisition unit configured to acquire update firmware for updating firmware of the printing apparatus, and a decompression unit configured to execute decompression processing of the update firmware acquired by the acquisition unit, wherein in a case where the reception unit receives the user operation, the decompression unit suspends the decompression processing being executed.

In a third aspect of the present invention, there is provided a method of controlling a printing apparatus, comprising performing print processing based on a print job, acquiring update firmware for updating firmware of the printing apparatus, executing decompression processing of the update firmware acquired by said acquiring, and suspending the decompression processing being executed, in a case where the print processing is to be executed during execution of the print processing.

In a fourth aspect of the present invention, there is provided a method of controlling a printing apparatus that is capable of performing print processing, comprising receiving a user operation, acquiring update firmware for updating firmware of the printing apparatus, executing decompression processing of the update firmware acquired by said acquiring, and suspending the decompression processing being executed, in a case where the user operation is received during execution of the print processing.

In a fifth aspect of the present invention, there is provided a non-transitory computer-readable storage medium storing a computer-executable program for executing a method of controlling a printing apparatus, wherein the method comprises performing print processing based on a print job, acquiring update firmware for updating firmware of the printing apparatus, executing decompression processing of the update firmware acquired by said acquiring, and suspending the decompression processing being executed, in a case where the print processing is to be executed during execution of the print processing.

In a sixth aspect of the present invention, there is provided a non-transitory computer-readable storage medium storing a computer-executable program for executing a method of controlling a printing apparatus that is capable of performing print processing, wherein the method comprises receiving a user operation, acquiring update firmware for updating firmware of the printing apparatus, executing decompression processing of the update firmware acquired by said acquiring, and suspending the decompression processing being executed, in a case where the user operation is received during execution of the print processing.

According to the present invention, update software is downloaded by background processing, and when it is determined that predetermined processing is not being performed, the downloaded update software is decompressed by background processing, whereby the installed software is updated using the decompressed update software. This makes it possible to provide the printing apparatus that is capable of reducing downtime caused by software update, the method of controlling the same, and the storage medium.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
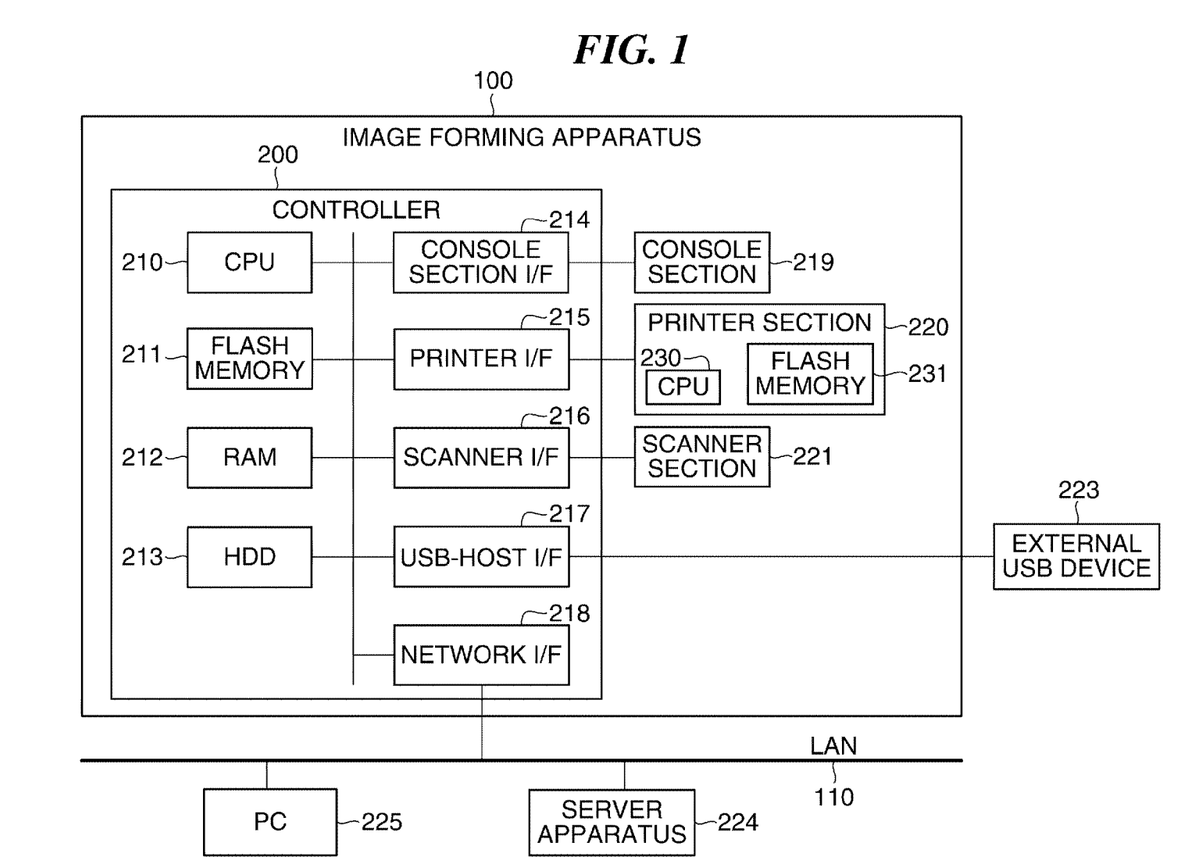
FIG. 1 is a schematic block diagram of an image forming apparatus as a printing apparatus according to an embodiment of the present invention.

FIG. 1 is a schematic block diagram of an image forming apparatus 100 as a printing apparatus according to an embodiment of the present invention.

Referring to FIG. 1, the image forming apparatus 100 includes a controller 200, a console section 219, a printer section 220, and a scanner section 221, and is connected to a PC 225 and a server apparatus 224 via a LAN 110. Further, the image forming apparatus 100 is connected to external USB devices 223, such as a USB memory and a USB keyboard.

The controller 200 controls the overall operation of the image forming apparatus 100. The console section 219 displays various information to a user, and receives operation inputs from the user. The scanner section 221 reads an original, and outputs image data indicative of the read original image to the controller 200.

The printer section 220 includes a CPU 230 and a flash memory 231. In the printer section 220, the CPU 230 executes a program stored in the flash memory 231, and thereby causes the printer section 220 to perform various operations of a process for printing an image on a recording medium, such as a sheet, based on the image data output from the controller 200.

Further, the controller 200 is comprised of a CPU 210, a flash memory 211, a RAM 212, an HDD 213, a console section interface 214, a printer interface 215, a scanner interface 216, a USB host interface 217, and a network interface 218.

Figure 4:
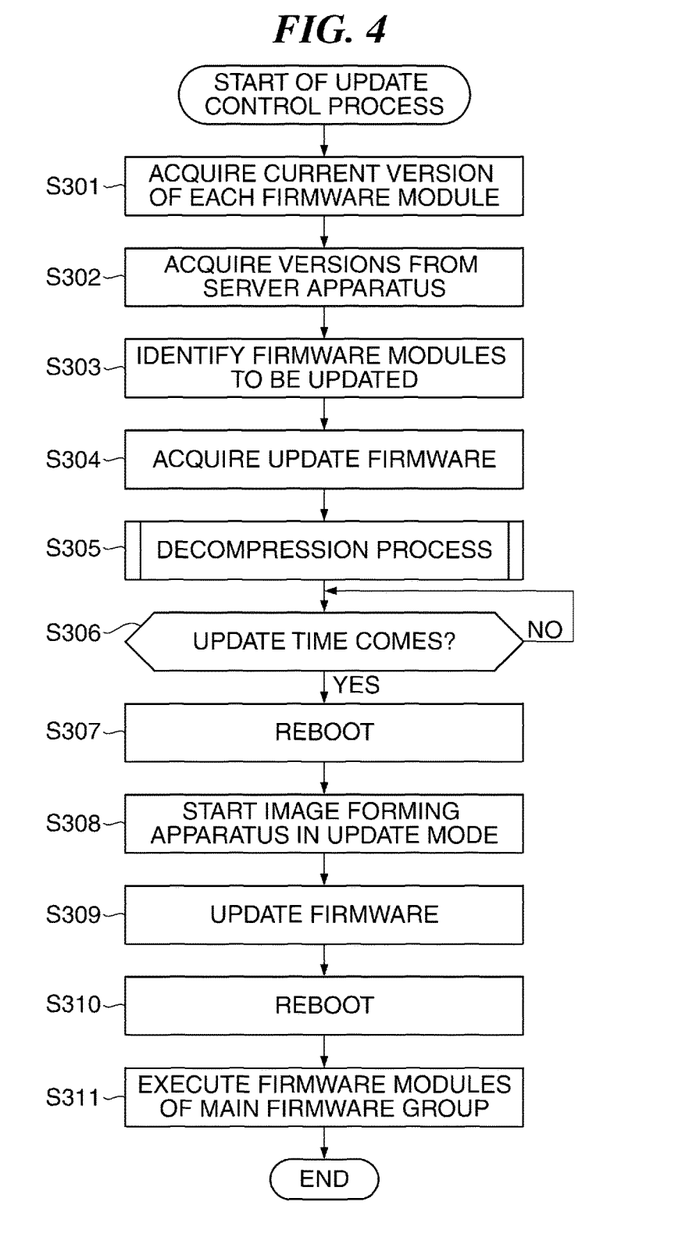
FIG. 4 is a flowchart of an update control process performed by the CPU.
Figure 5:
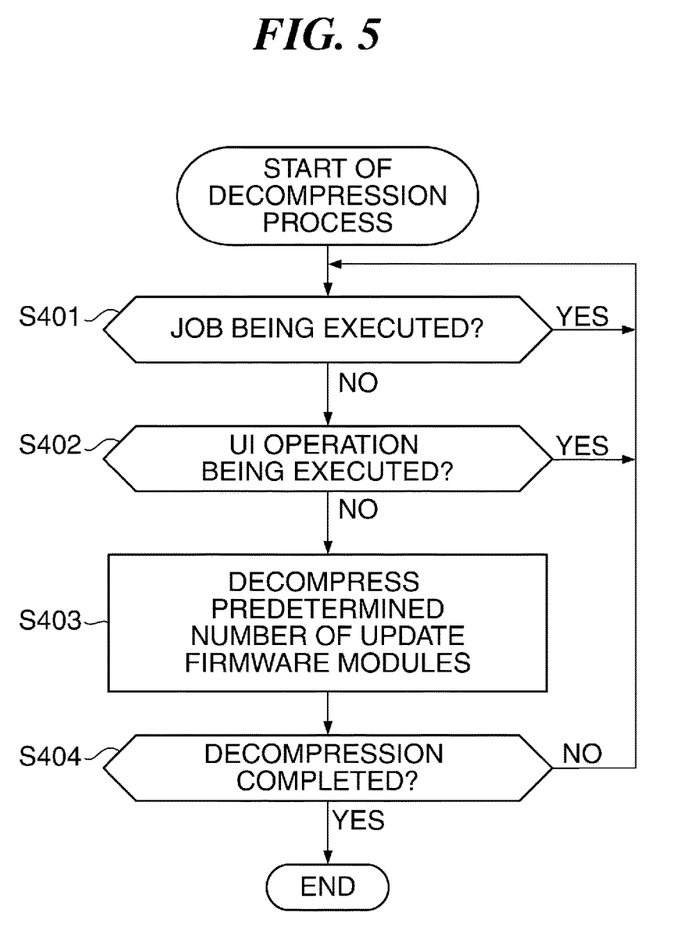
FIG. 5 is a flowchart of a decompression process performed in a step S305 in FIG. 4.
Figure 6:
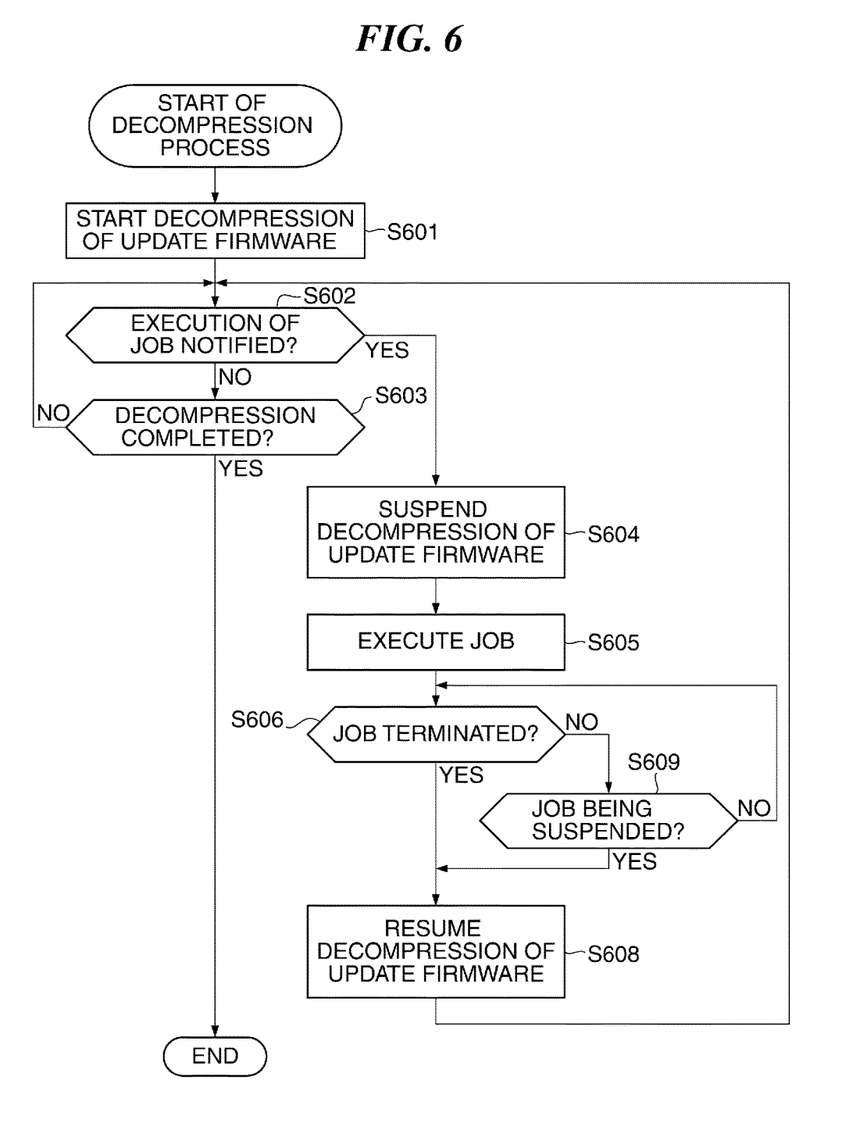
FIG. 6 is a flowchart of a variation of the decompression process performed in the step S305 in FIG. 4.

The CPU 210 controls the other components of the controller 200 to thereby control the overall operation of the image forming apparatus 100. Processes described hereinafter with reference to FIGS. 4 to 6 are performed by the CPU 210 which executes programs loaded from the flash memory 211 into the RAM 212. The flash memory 211 stores various data, such as settings used by the image forming apparatus 100, and various programs. The RAM 212 is used as a work area of the CPU 210, and stores various data and various programs.

The HDD 213 stores various programs and various data. The console section interface 214 is an interface between the console section 219 and the controller 200. The printer interface 215 is an interface between the printer section 220 and the controller 200. The scanner interface 216 is an interface between the scanner section 221 and the controller 200.

The USB host interface 217 is an interface between the external USB device 223 and the image forming apparatus 100. The network interface 218 is an interface for connecting to the LAN 110 to communicate with the PC 225 and the server apparatus 224. In the present embodiment, software can be downloaded via the network interface 218 from the server apparatus 224 which is an external apparatus.

Note that in the following description, software is referred to as the firmware. Further, software for updating the firmware installed in the image forming apparatus 100 is referred to as the update firmware.

Further, the update firmware in the present embodiment is encoded e.g. by encryption and compression, and hence when updating the firmware, the update firmware is required to be decoded. In the following description, decompression refers to processing for decoding the encoded update software.

Note that in a case where the external USB memory device 223 is a USB memory storing update firmware, the update firmware can be copied from this USB memory.

Figure 2:
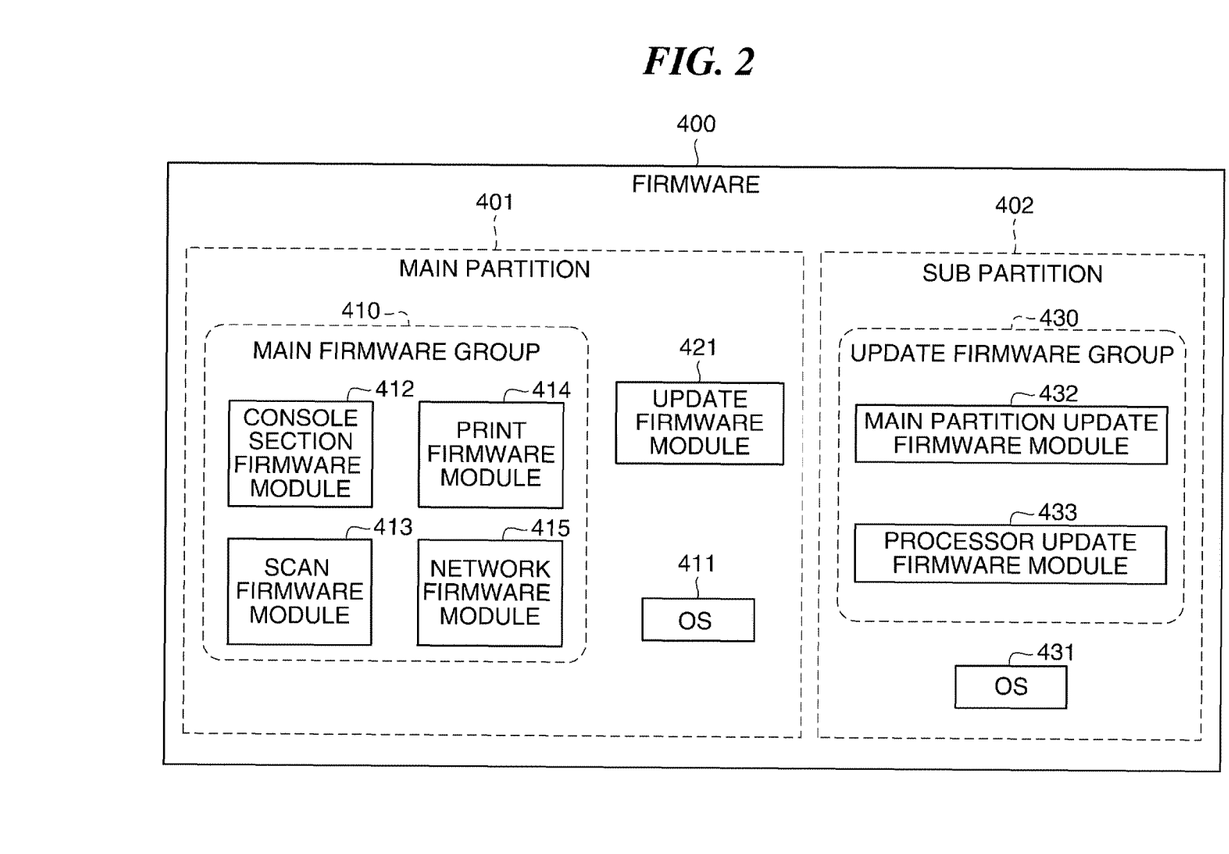
FIG. 2 is a diagram of the configuration of firmware executed by a CPU appearing in FIG. 1.

FIG. 2 is a diagram of the arrangement of the firmware 400 executed by the CPU 210 appearing in FIG. 1.

Referring to FIG. 2, the firmware 400 of the image forming apparatus 100 is divided and stored in two partitions of the flash memory 211.

One of the two partitions is a main partition 401, and the other is a sub partition 402. To cause the image forming apparatus 100 to perform normal operations, an operating system (hereinafter referred to as the "OS") 411 stored in the main partition 401 is executed by the CPU 210.

To update firmware in the main partition 401, an OS 431 stored in the sub partition 402 is executed by the CPU 210.

First, the main partition 401 will be described. The main partition 401 contains three firmware groups: the OS 411, a main firmware group 410, and an updating firmware module 421.

The OS 411 is an operating system for controlling the image forming apparatus 100, and includes driver programs for controlling operations of the respective sections of the image forming apparatus 100 including the printer section 220. The updating firmware module 421 is firmware that decompresses each update firmware acquired e.g. from the server apparatus 224.

Firmware modules included in the main firmware group 410 will be described. These firmware modules are executed by the OS 411 after the OS 411 is started up.

A console section firmware module 412 is firmware for controlling the console section 219. A scan firmware module 413 is firmware for controlling scan processing executed by the scanner section 221.

A print firmware module 414 is firmware for controlling print processing executed by the printer section 220. A network firmware module 415 is firmware for performing communication with the PC 225 and the server apparatus 224 connected to the LAN 110.

Next, the sub partition 402 will be described. The sub partition 402 contains two firmware groups: the OS 431 and an updating firmware group 430. The OS 431 is an operating system for controlling the image forming apparatus 100, and is similar to the OS 411.

Firmware modules included in the updating firmware group 430 will be described. These firmware modules are executed by the OS 431 after the OS 431 is started up.

A main partition updating firmware module 432 is firmware for updating the firmware modules contained in the main partition 401. In a case where the update firmware is in an encoded state, each firmware module contained in the update firmware is updated after decompressing the update firmware.

On the other hand, if the update firmware has been decompressed by the updating firmware module 421 in advance, each firmware module is updated using the decompressed update firmware. This reduces a processing time required for the update.

A processor updating firmware module 433 is firmware for updating firmware modules stored in the flash memory 231 for executing print processing.

In updating the above-described firmware modules, in a case, for example, where update firmware is in the form of a patch, an associated firmware module is updated by applying the patch to the firmware module stored in the main partition 401.

Further, in a case where update firmware is an updated firmware module itself, the firmware module stored in the main partition 401 is replaced by the update firmware to thereby update the firmware module.

In updating any of the above-described firmware modules, the image forming apparatus 100 acquires the currently released version(s) of associated firmware module(s) from the server apparatus 224.

Figure 3:
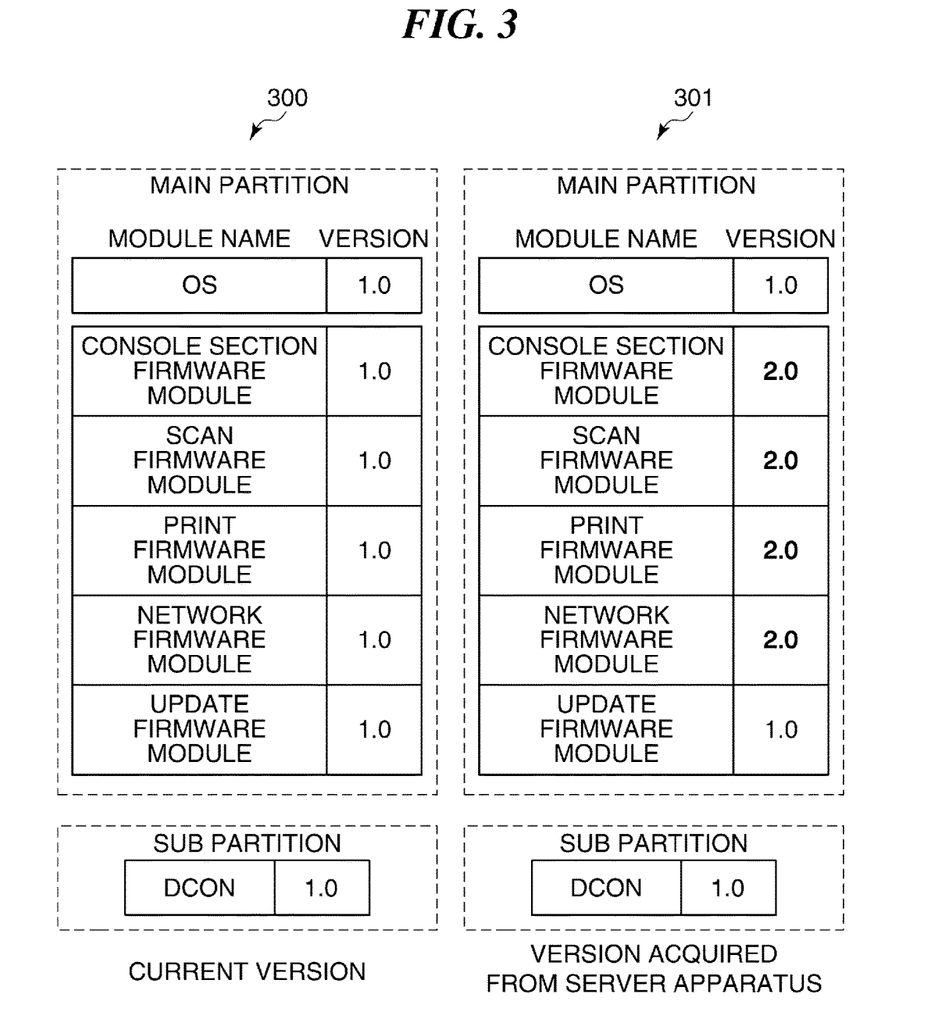
FIG. 3 is a diagram showing an example of versions of firmware modules currently installed in the image forming apparatus and versions of the same acquired from a server apparatus.

FIG. 3 is a diagram showing an example of firmware modules of the current version 300 of the image forming apparatus 100 and firmware modules of a version 301 acquired from the server apparatus 224.

Referring to FIG. 3, the versions 300 and 301 indicate the version of the firmware in the main partition 401 and the version of the firmware in the sub partition 402, respectively. Note that as the firmware in the sub partition 402, DCON which is one of the firmware modules for executing print processing, stored in the flash memory 231, is taken as an example.

Note that the current version of each firmware module is acquired by the CPU 210 that executes the updating firmware module 421 via the OS 411. Further, to acquire the version from the server apparatus 224, model ID information for identifying the image forming apparatus 100 and a version acquisition request are transmitted to the server apparatus 224. The version may be acquired not only from the server apparatus 224, but also from the external USB device 223, the PC 225, or the like.

When comparing the version 300 and the version 301, shown in FIG. 3, it is found that the firmware modules to be updated are four firmware modules: the console section firmware module, the scan firmware module, the print firmware module, and the network firmware module, which are different in version. Therefore, in FIG. 3, the four update firmware modules are to be downloaded.

Note that the update firmware to be downloaded may be designated by a user via the console section 219 by displaying a display screen for designating the update firmware on the console section 219. Further, the latest combination may be identified as the firmware to be updated without receiving designation from an operator.

FIG. 4 is a flowchart of an update control process performed by the CPU 210, appearing in FIG. 1.

This update control process is performed when execution thereof is instructed by a user via the console section 219 or when a date and time set in advance comes. This date and time is not limited to a specified date and time, but is sometimes set by specifying fixed intervals.

Referring to FIG. 4, the CPU 210 executes the updating firmware module 421 to thereby acquire the current versions of the respective firmware modules of the image forming apparatus 100, described with reference to FIG. 3 (step S301). Then, the updating firmware module 421 acquires the versions from the server apparatus 224 (step S302), and identifies the firmware modules to be updated (step S303).

Then, the updating firmware module 421 acquires update firmware associated with the firmware modules to be updated from the server apparatus 224 (step S304). The update firmware acquired in this step is stored in the HDD 213. The step S304 corresponds to the operation of a download unit configured to download update software by background processing.

Then, the updating firmware module 421 executes a decompression process for decompressing the update firmware (step S305). This decompression process is a process for decoding the update firmware and storing the decrypted update firmware in the HDD 213.

Then, the CPU 210 determines whether or not the update time comes (step S306). This update time is a time set by the user in advance. If the update time is not set, or if the update is instructed by the user from the console section 219, the step S306 is skipped.

When the update time comes (YES to the step S306), the image forming apparatus 100 is rebooted (step S307), and is started up in an update mode for updating the firmware (step S308). At this time, the CPU 210 executes the modules of the updating firmware group 430. Further, in the step S308 to S311, the normal operation of the image forming apparatus 100, such as execution of a print job, cannot be performed. In steps other than the steps S308 to S311, the update is executed by background processing, and hence the normal operation can be performed.

Then, the CPU 210 executes the main partition updating firmware module 432 to thereby update the modules stored in the main partition 401 (step S309). If the firmware modules stored in the sub partition 402 are to be updated, the CPU 210 executes the processor updating firmware module 433 in parallel to thereby update the firmware modules in the sub partition 402. The step S309 corresponds to the operation of an update unit configured to update installed software using the decompressed update software.

When the update of the firmware is finished, the image forming apparatus 100 is rebooted (step S310). Then, when the image forming apparatus 100 is restarted, the CPU 210 executes the respective updated firmware modules in the main firmware group 410 to thereby operate the image forming apparatus 100 according to the updated modules (step S311), followed by terminating the present process.

FIG. 5 is a flowchart of the decompression process performed in the step S305 in FIG. 4.

Referring to FIG. 5, the CPU 210 determines whether or not the image forming apparatus 100 is executing any job (step S401). The determination method used in this step will be described hereinafter.

If it is determined in the step S401 that the image forming apparatus 100 is executing any job (YES to the step S401), the CPU 210 executes the step S401 again. At this time, the CPU 210 may execute the step S401 again after a predetermined time period elapses.

On the other hand, if it is determined in the step S401 that the image forming apparatus 100 is not executing any job (NO to the step S401), the CPU 210 inquires the console section firmware module 412 about whether or not a UI operation is being performed to thereby determine whether or not the UI operation, which is interactive processing with a user, is being performed on the console section 219 (step S402). The steps S401 and S402 correspond to the operation of a determination unit configured to determine whether or not predetermined processing is being performed.

If it is determined in the step S402 that the UI operation is being performed on the console section 219 (YES to the step S402), the process returns to the step S401. Also in this case, the step S401 may be executed again after a predetermined time period elapses after the determination.

On the other hand, if it is determined in the step S402 that the UI operation is not being performed on the console section 219 (NO to the step S402), the updating firmware module 421 decompresses the predetermined number of updating firmware modules (step S403). The step S403 corresponds to the operation of a decompression unit configured to decompress downloaded update software by background processing in a case where predetermined processing is not being performed.

Further, the predetermined number is set to restrict the number of updating firmware modules to be simultaneously decompressed in a case where a plurality of updating firmware modules are to be decompressed. For example, in a case where the number is set to 1, when one updating firmware module is decompressed, the process proceeds to the next step S404. Therefore, in a case where the number is set to 1 in the illustrated example in FIG. 3, the console section firmware module, the scan firmware module, the print firmware module, and the network firmware module are sequentially decompressed one by one in each one loop processing.

As described above, in the present embodiment, it is determined whether or not predetermined processing is being performed whenever a predetermined number of updating firmware modules are decompressed, and if it is determined that predetermined processing is not being performed, the update software is decompressed by background processing.

Then, the updating firmware module 421 determines whether or not decompression of the update firmware is completed (step S404). In this step, it is determined whether or not decompression of all modules of the updating firmware is completed.

If it is determined in the step S404 that decompression of the update firmware is not completed (NO to the step S404), the process returns to the step S401. On the other hand, if it is determined in the step S404 that decompression of the update firmware is completed (YES to the step S404), the present process is terminated.

A method of determination in the step S401 will be described. In the step S401, for example, the determination is performed by checking whether or not the print firmware module 414 is performing the print control, and checking whether or not the scan firmware module 413 is performing the scan control. Therefore, if neither the print firmware module 414 nor the scan firmware module 413 is performing the control, it is determined that the image forming apparatus 100 is not executing any job.

Further, it is assumed that the job in this step is processing executed according to an instruction of the user. This is to prevent the user from feeling processing delay due to decompression. Since print processing, copy processing, scan processing, and so on, are executed according to an instruction of a user, these jobs each correspond to the predetermined processing.

As described above, execution of a job and the UI operation cannot be performed during operation of the image forming apparatus 100 in the update mode. Therefore, as shown in the decompression process described above, the update firmware is decompressed in advance while checking whether or not any job is being executed, in the steps S401 to S404, and each module is updated using the update firmware decompressed in the step S310 in FIG. 4.

This makes it possible to reduce the time required to update the firmware, and hence it is possible to reduce downtime in which execution of a job and the UI operation cannot be performed.

FIG. 6 is a flowchart of a variation of the decompression process performed in the step S305 in FIG. 4.

Referring to FIG. 6, the updating firmware module 421 starts decompression of the update firmware (step S601). Then, the CPU 210 determines whether or not execution of a job is notified (step S602). Execution of a job in this step refers to any of execution of a new job and resumption of a suspended job.

For example, when the print firmware module 414 executes or resumes a job, or when the scan firmware module 413 executes or resumes a job, the start of control is notified to the updating firmware module 421.

If it is determined in the step S602 that execution of a job is not notified (NO to the step S602), the CPU 210 determines whether or not decompression of the update firmware is completed (step S603). In this step, it is determined whether or not decompression of all updating firmware modules is completed.

If it is determined in the step S603 that decompression of the update firmware is not completed (NO to the step S603), the process returns to the step S602. On the other hand, if it is determined in the step S603 that decompression of the update firmware is completed (YES to the step S603), the present process is terminated.

Referring back to the step S602, if it is determined in the step S602 that execution of any job is notified (YES to the step S602), the CPU 210 suspends decompression of the update data (step S604), and executes the notified job (step S605). Execution of the job in this step refers to any of execution of a new job and resumption of a suspended job, similarly to the step S602.

Then, the CPU 210 determines whether or not the job is terminated (step S606). If the job is terminated, for example, termination of the job is notified from the print firmware module 414 or the scan firmware module 413 to the updating firmware module 421.

If it is determined in the step S606 that the job is terminated (YES to the step S606), the CPU 210 resumes decompression of the update firmware (step S608), and returns to the step S602.

On the other hand, if it is determined in the step S606 that the job is not terminated (NO to the step S606), the CPU 210 determines whether or not the job is being suspended (step S609). For example, if a paper-out condition occurs, a print job is suspended. When the job is suspended, suspension of the job is notified to the updating firmware module 421.

If it is determined in the step S609 that the job is not suspended (NO to the step S609), the process returns to the step S606. On the other hand, if it is determined in the step S609 that the job is being suspended (YES to the step S609), the process proceeds to the step S608.

According to the variation of the decompression process in FIG. 6, the start, suspension, and completion of the job are determined in the steps S602, S609, and S606, respectively, and the update firmware is decompressed during a time period in which no job is being executed, whereby it is possible to decompress the update firmware while more preferentially executing a job than in the decompression process in FIG. 5.

Further, as shown in the variation of the decompression process in FIG. 6, in the present embodiment, if predetermined processing is to be executed when the update software is being decompressed by background processing, decompression of the update software is suspended (step S604). Further, when the predetermined processing is suspended, the update software is decompressed (YES to the step S609).

As described above, according to the present embodiment, the update software is downloaded by background processing (step S304), and when it is determined that predetermined processing is not being performed, the downloaded update software is decompressed by background processing (step S403).

Then, the installed software is updated using the decompressed update software (step S309), and hence it is possible to reduce down time caused by software update.

Further, according to the present embodiment, when predetermined processing is being performed, decompression of the update software is not performed, and hence it is possible to prevent a user from feeling processing delay.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095256 filed May 2, 2014, which is hereby incorporated by reference herein in its entirety.

What is claimed is:

1. A printing apparatus comprising:
a printer engine configured to perform print processing based on a print job;
at least one processor connected to at least one memory, the at least one processor and at least one memory configured to:
acquire update firmware for updating firmware of the printing apparatus by downloading the update firmware;
execute decompression processing of decompressing, after reception of the update firmware by downloading the update firmware is completed, the acquired update firmware; and
update the firmware of the printing apparatus using the decompressed update firmware,
wherein upon condition that a new print job causing the printer engine to print occurs after having started execution of the decompression processing and before finishing the decompression processing, the decompression processing is suspended from being executed, and
wherein in a case where the decompression processing is completed, said printing apparatus is shifted to an update mode in which the print job cannot be executed, and the firmware of the printing apparatus is updated using the decompressed update firmware after the printing apparatus has been shifted to the update mode.

2. The printing apparatus according to claim 1, wherein in a case where the new print job is completed, the decompression processing is resumed.

3. The printing apparatus according to claim 1, wherein the update firmware is acquired from an external apparatus.

4. The printing apparatus according to claim 1, wherein the decompression processing is processing for decompressing the update firmware in the background during normal operation of the printing apparatus.

5. The printing apparatus according to claim 1, the at least one processor and at least one memory further configured to:
determine whether or not the new print job occurs during execution of the decompression processing,
wherein the decompression processing is suspended in a case where it is determined by said determination unit that the new print job occurs.

6. The printing apparatus according to claim 1, wherein in a case where the decompression processing is completed and an update time preliminarily set in the printing apparatus is reached, said printing apparatus is shifted to an update mode in which the print job cannot be executed, and the firmware of the printing apparatus is updated using the decompressed update firmware, after the printing apparatus has been shifted to the update mode.

7. A method of controlling a printing apparatus, comprising:
performing print processing based on a print job;
acquiring update firmware for updating firmware of the printing apparatus by downloading the update firmware;
executing decompression processing of decompressing, after reception of the update firmware by downloading the update firmware is completed, the acquired update firmware;
updating the firmware of the printing apparatus using the decompressed update firmware;
suspending the decompression processing being executed, upon condition that a new print job causing the print processing occurs after having started execution of the decompression processing and before finishing the decompression processing, and
shifting, in a case where the decompression processing is completed, the printing apparatus to an update mode in which the print job cannot be executed, and updating the firmware of the printing apparatus using the decompressed update firmware after the printing apparatus has been shifted to the update mode.

8. A non-transitory computer-readable storage medium storing a computer-executable program for executing a method of controlling a printing apparatus,
wherein the method comprises:
performing print processing based on a print job;

acquiring update firmware for updating firmware of the printing apparatus by downloading the update firmware;

executing decompression processing of decompressing, after reception of the update firmware by downloading the update firmware is completed, the acquired update firmware;

updating the firmware of the printing apparatus using the decompressed update firmware;

suspending the decompression processing being executed, upon condition that a new print job causing the print processing occurs after having started execution of the decompression processing and before finishing the decompression processing, and shifting, in a case where the decompression processing is completed, the printing apparatus to an update mode in which the print job cannot be executed, and updating the firmware of the printing apparatus using the decompressed update firmware after the printing apparatus has been shifted to the update mode.

* * * * *